US006754678B2

(12) United States Patent
Norris et al.

(10) Patent No.: US 6,754,678 B2
(45) Date of Patent: Jun. 22, 2004

(54) SECURELY AND AUTONOMOUSLY SYNCHRONIZING DATA IN A DISTRIBUTED COMPUTING ENVIRONMENT

(75) Inventors: Jeffery S. Norris, La Crescenta, CA (US); Paul G. Backes, La Crescenta, CA (US)

(73) Assignee: California Institute of Technology, Pasadena, CA (US)

( * ) Notice: Subject to any disclaimer, the term of this patent is extended or adjusted under 35 U.S.C. 154(b) by 447 days.

(21) Appl. No.: 09/746,550

(22) Filed: Dec. 20, 2000

(65) Prior Publication Data

US 2002/0095568 A1 Jul. 18, 2002

Related U.S. Application Data

(60) Provisional application No. 60/172,880, filed on Dec. 20, 1999.

(51) Int. Cl.[7] .............................................. G06F 17/30
(52) U.S. Cl. ........................................ 707/201; 707/203
(58) Field of Search ...................... 707/201, 10, 500.1; 380/30, 260, 285; 709/223, 219; 713/201

(56) References Cited

U.S. PATENT DOCUMENTS 6,370,573 B1 * 4/2002 Bowman-Amuah ......... 709/223
6,405,219 B2 * 6/2002 Saether et al. .............. 707/201

* cited by examiner

Primary Examiner—Diane D. Mizrahi
Assistant Examiner—Apu Mofiz
(74) Attorney, Agent, or Firm—J. D. Harriman, II, Esq.; Coudert Brothers LLP

(57) ABSTRACT

The description relates to securely and autonomously synchronizing data on geographically distributed computers. Data is distributed from a central server to geographically distributed clients. In another embodiment, data is encrypted and securely transmitted over a computer network. It uses the Secure Sockets Layer protocol to secure transmitted data. The data is transmitted via the Internet. Data is distributed in real-time. Data is provided to a user as the data updates without the user making a specific request for updated data. Portions of data are made available to only authorized users. An administrator sets permissions to control which data is transmitted to a user. The transmission of data is secure in both directions. Data transmitted to a user from a central location is secure and data transmitted to a central location from a user is secure. Data is securely transmitted to a user independent of the platform on the user's machine. In this embodiment, the software that controls the data delivery system is written in a platform independent programming language, such as Java.

69 Claims, 17 Drawing Sheets

SECURELY AND AUTONOMOUSLY SYNCHRONIZING DATA IN A DISTRIBUTED COMPUTING ENVIRONMENT

CROSS-REFERENCE TO RELATED APPLICATIONS

The present application is based on a U.S. provisional application serial No. 60/172,880 filed on Dec. 20, 1999 and claims priority to that application.

BACKGROUND OF THE INVENTION

1. Field of the Invention

The present invention relates primarily to the field of computer software, and in particular to securely and autonomously synchronizing data in a distributed computing environment.

Portions of the disclosure of this patent document contains material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

Typically, secure data delivery systems are faced with the problem of receiving large amounts of sensitive and classified data, storing it in a database for processing, and distributing current data securely to the intended user while ensuring all users have access to updated data. Frequently, the intended user is not present at the site where the data is accumulated. Thus, the data must be transmitted to the location of the user. If the data is sensitive (e.g., military data), it must be protected from hackers who could alter the data making it unusable or dangerous to use. Additionally, data modified by one user must be reflected in the data possessed by all appropriate users of the system. Prior art methods of secure data delivery are insufficient. This problem can be better understood by a review of data delivery systems.

Data Delivery Systems

In some computer systems, data is gathered at a central location and must be distributed to multiple users in different locations. For example, a typical National Aeronautics and Space Administration (NASA) mission involves scientists located all over the globe. Many of those scientists are not able to stay at mission control for the entire duration of the mission. Thus, data must be transmitted to the scientists involved who cannot be present at mission control.

In other examples, such as commanding robotic mining vehicles, robotic arms for delicate surgeries or robotic agricultural vehicles, there is a need to convey precise, secure, and real time information from the user to the vehicle or vice-versa. In one example, an engineer is on surface while the robotic mining vehicle is miles below the surface or in a different location. Secure communication is needed to transmit accurate mining conditions to the engineer and to send appropriate actions to the robotic mining vehicle. If the data transmission is not secure, a malicious individual could alter the data to cause actions which would harm the robotic mining vehicle.

In another example, a surgeon may be in a different location as a patient. Secure communication is needed to transmit precise and secure instructions to the robotic arm based on precise and secure information securely transmitted to the surgeon. If the data transmission is not secure, a malicious individual could alter the data to cause actions which would harm the patient. Similarly, in another example, a robotic agricultural vehicle is manned by a farmer at a location which is several miles away from the farm. Secure communication is needed to transmit instructions regarding speed of the vehicle, and height of the cutting blade depending on information securely transmitted to the farmer from sensors placed on the vehicle. If the data transmission is not secure, a malicious individual could alter the data to cause actions which would harm the robotic agricultural vehicle.

Data Security

In some instances, it is desirable to transmit data securely. Secure transmission prevents an unintended user from reading or altering the transmitted data. One prior art method of secure data delivery involves dedicated lines of transmission. However, data transmission systems which use dedicated transmission lines are expensive. Additionally, the dedicated lines must be physically secure. If the dedicated lines are not physically secure, an unauthorized individual can add a device to the dedicated line and read or alter the transmitted data.

Some less expensive prior art data delivery systems use the Internet as a means of transmitting data. However, information sent via the Internet is typically insecure. The lack of security of the Internet and the expense of dedicated lines frequently discourage implementation of secure data transmission systems. For example, NASA sometimes does not distribute classified mission data and, instead, requires scientists to be present at mission control.

Cryptographic Systems

A cryptographic system is a system for sending a message from a sender to a receiver over a medium so that the message is "secure", that is, so that only the intended receiver can recover the message. Additionally, cryptographic systems authenticate messages. Authenticating a message means determining whether the message is actually from the purported sender.

A cryptographic system converts a message, referred to as "plaintext" into an encrypted format, known as "ciphertext." The encryption is accomplished by manipulating or transforming the message using a "cipher key" or keys. The receiver "decrypts" the message, that is, converts it from ciphertext to plaintext, by reversing the manipulation or transformation process using the cipher key or keys. So long as only the sender and receiver have knowledge of the cipher key, such an encrypted transmission is secure.

A "classical" cryptosystem is a cryptosystem in which the enciphering information can be used to determine the deciphering information. To provide security, a classical cryptosystem requires that the enciphering key be kept secret and provided to users of the system over secure channels. Secure channels, such as secret couriers, secure telephone transmission lines, or the like, are often impractical and expensive.

A system that eliminates the difficulties of exchanging a secure enciphering key is known as "public key encryption." By definition, a public key cryptosystem has the property that someone who knows only how to encipher a message cannot use the enciphering key to find the deciphering key without a prohibitively lengthy computation. An enciphering function is chosen so that once an enciphering key is known, the enciphering function is relatively easy to compute. However, the inverse of the encrypting transformation function is difficult, or computationally infeasible, to compute. Such a function is referred to as a "one way function" or as a "trap door function." In a public key cryptosystem, certain information relating to the keys is public. This information can be, and often is, published or transmitted in a non-secure manner. Also, certain information relating to the keys is private. This information may be distributed over a secure channel to protect its privacy, (or may be created by a local user to ensure privacy).

A block diagram of a typical public key cryptographic system is illustrated in FIG. 1. A sender represented by the blocks within dashed line (100) sends a plaintext message, Ptxt, to a receiver, represented by the blocks within dashed line (115). The plaintext message is encrypted into a ciphertext message, C, transmitted over some transmission medium and decoded by the receiver (115) to recreate the plaintext message Ptxt.

The sender (100) includes a cryptographic device (101), a secure key generator (102) and a key source (103). The key source (103) is connected to the secure key generator (102) through line (104). The secure key generator (102) is coupled to the cryptographic device (101) through line (105). The cryptographic device provides a ciphertext output, C, on line (106). The secure key generator (102) provides a key output on line (107). This output is provided, along with the ciphertext message (106), to transmitter receiver (109). The transmitter receiver (109) may be, for example, a computer transmitting device such as a modem or it may be a device for transmitting radio frequency transmission signals. The transmitter receiver (109) outputs the secure key and the ciphertext message on an insecure channel (110) to the receiver's transmitter receiver (111).

The receiver (115) also includes a cryptographic device (116), a secure key generator (117) and a key source (118). The key source (118) is coupled to the secure key generator (117) on line (119). The secure key generator (117) is coupled to the cryptographic device (116) on line (120). The cryptographic device (116) is coupled to the transmitter receiver (111) through line (121). The secure key generator (117) is coupled to the transmitter receiver (111) on lines (122) and (123).

In operation, the sender (100) has a plaintext message, Ptxt, to send to the receiver (115). Both the sender (100) and the receiver (115) have cryptographic devices (101) and (116), respectively, that use the same encryption scheme. There are a number of suitable cryptosystems that can be implemented in the cryptographic devices. For example, they may implement the Data Encryption Standard (DES) or some other suitable encryption scheme.

Sender and receiver also have secure key generators (102) and (117), respectively. These secure key generators implement any one of several well known public key exchange schemes. These schemes, which will be described in detail below, include the Diffie-Helhnan scheme, the RSA scheme, the Massey-Omura scheme, and the ElGamal scheme.

The sender (100) uses key source (103), which may be a random number generator, to generate a private key. The private key is provided to the secure key generator (102) and is used to generate an encryption key, $e_K$. The encryption key, $e_K$, is transmitted on lines (105) to the cryptographic device and is used to encrypt the plaintext message, Ptxt, to generate a ciphertext message, C, provided on line (106) to the transmitter receiver (109). The secure key generator (102) also transmits the information used to convert to the secure key from key source (103) to the encryption key, $e_K$. This information can be transmitted over an insecure channel, because it is impractical to recreate the encryption key from this information without knowing the private key.

The receiver (115) uses key source (118) to generate a private and secure key (119). This private key (119) is used in the secure key generator (117) along with the key generating information provided by the sender (100) to generate a deciphering key, $D_K$. This deciphering key, $D_K$, is provided on line (120) to the cryptographic device (116) where it is used to decrypt the ciphertext message and reproduce the original plaintext message.

Authentication

In addition to protecting the contents of a transmitted message, it is also desired to provide a way to determine the "authenticity" of the message. That is, is the message actually from the purported sender. A scheme for accomplishing this is to append a so-called "digital signature" to the message. The enciphering transformation $f_A$ is used to send a message to user A and $f_B$ is the enciphering transformation used to send a message to user B. User A provides a "signature", P, that may include some specific information, such as the time the message was sent or an identification number. User A transmits the signature as $f_B f_A^{-1}$ (P). When user B deciphers the message using $f_B^{-1}$, the entire message is decoded into plaintext except the signature portion, which remains $f_A^{-1}$ (P). User B then applies user A's public key $f_A$ to obtain P. Since P could only have been encrypted by user A (because only user A knows $f_A^{-1}$) user B can assume that the message was sent by user A.

Another scheme of digital signature authentication is a generalization of the ElGamal discrete logarithm scheme, using elliptic algebra. Assume a public key ourPub generated with a function of a private key ourPri. The signature is generated by first choosing a random integer, m, of approximately q bits. Next, a point, $P=m°(X_1/1)$, is computed. A message digest function, M, is used to compute an integer, u, that is a function of m, ourPri, and the digested version of the ciphertext message and the computed point, P. The computed pair (u, P) is transmitted as the signature.

At the receiving end, the value of the signature is used to compute the point $Q=u°(X_1/1)$. A point, R, is calculated using P, the digested version of the ciphertext message and P, and myPub. If R and Q do not compare exactly, the signature is not valid (not genuine). The security of this scheme relies on the computational unfeasibility of breaking the elliptic logarithm operation or the hash function, M. A disadvantage of this scheme is that it is computationally intensive, making it complex and slow in operation.

The Diffie-Hellman Scheme

A scheme for public key exchange is presented in Diffie and Hellman, "New Directions in Cryptography," IEEE Trans. Inform. Theory, vol. IT-22, pp. 644–654, November 1976 (The "DH" scheme). The DH scheme describes a public key system based on the discrete exponential and logarithmic functions. If "q" is a prime number and "a" is a primitive element, then X and Y are in a 1:1 correspondence for $1 \leq X, Y \leq (q-1)$ where $Y=a^X \mod q$, and $X=\log_a Y$ over the finite field. The first discrete exponential function is easily evaluated for a given a and X, and is used to compute the public key Y. The security of the Diffie-Hellman system relies on the fact that no general, fast algorithms are known for solving the discrete logarithm function $X=\log_a Y$ given X and Y.

In a Diffie-Hellman system, a directory of public keys is published or otherwise made available to the public. A given public key is dependent on its associated private key, known only to a user. However, it is not feasible to determine the private key from the public key. For example, a sender has a public key, referred to as "ourPub". A receiver has a public key, referred to here as "theirPub". The sender also has a private key, referred to here as "myPri". Similarly, the receiver has a private key, referred to here as "theirPri".

There are a number of elements that are publicly known in a public key system. In the case of the Diffie-Hellman system, these elements include a prime number, p, and a primitive element, g. Both p and g are publicly known. Public keys are then generated by raising g to the private key power (mod p). For example, a sender's public key, myPub, is generated by the following equation:

$$myPub = g^{myPri} (\mod p) \quad \text{Equation (1)}$$

Similarly, the receiver's public key is generated by the equation:

$$theirpub = g^{theirPri} (\mod p) \quad \text{Equation (2)}$$

Public keys are easily created using exponentiation and modulo arithmetic. As noted previously, public keys are easily obtainable by the public. They are published and distributed. They may also be transmitted over non-secure channels. Even though the public keys are known, it is very difficult to calculate the private keys by the inverse function because of the difficulty in solving the discrete log problem.

In a Diffie-Hellman type system, a prime number, p, is chosen. This prime number, p, is public. Next, a primitive root, g, is chosen. This number, g, is also publicly known. Then, an enciphering key, $e_K$, is generated, the receiver's public key (theirpub) is raised to the power of the sender's private key (myPri). That is:

$$(theirPub)^{myPri} (\mod p) \quad \text{Equation (3)}$$

We have already defined theirPub equal to $g^{theirPri}(\mod p)$. Therefore Equation 3 can be given by:

$$(g^{theirPri})^{myPri} (\mod p) \quad \text{Equation (4)}$$

This value is the enciphering key $e_K$ that is used to encipher the plaintext message and create a ciphertext message. The particular method for enciphering or encrypting the message may be any one of several well known methods. Whichever encrypting method is used, the cipher key is the value calculated in Equation 4. The ciphertext message is then sent to the receiver.

The receiver generates a deciphering key $D_K$ by raising the public key of the sender (mypub) to the private key of the receiver (theirPri) as follows:

$$D_K = (myPub)^{theirPri} (\mod p) \quad \text{Equation (5)}$$

From Equation 1, myPub is equal to $g^{myPri}(\mod p)$. Therefore:

$$D_K = (g^{myPri})^{theirPri} (\mod p) \quad \text{Equation (6)}$$

Since $(g^A)^B$ is equal to $(g^B)^A$, the encipher key $e_K$ and the deciphering key $D_K$ are the same key.

The receiver simply executes the inverse of the transformation algorithm or encryption scheme using the de ciphering key to recover the plaintext message. Because both the sender and receiver must use their private keys for generating the enciphering key, no other users are able to read or decipher the ciphertext message.

Trust in Communication

The current boom in e-commerce relies to a certain extent on our ability to communicate securely. The slow but steady progress of Internet Protocol Security (IPSEC), the ongoing deployment of virtual private network (VPN) firewall technologies and the ever-widening use of Secure Sockets Layer (SSL) for secure transactions over the world-wide web are just a few examples of this.

Part of the ability to communicate securely is the level of trust in the belief that the communicating peers are who they say they are. Encryption ensures that a message cannot be read by intermediaries who pass the message along from sender to receiver or who intercept the message while it travels the path from sender to receiver. However, if the message is being sent to the wrong receiver, message security is compromised. Thus, if a user wishes to send sensitive data (e.g., credit card information) securely over a network, the sender needs to trust that the public key used is actually the public key of the intended receiver and that the intended receiver is what it claims to be.

FIG. 2 illustrates a scenario where a sender (200) wishes to send a secure message to an intended receiver (210) through a network (220). However, a false receiver (230) transmits its public key (240) to the sender across network path A, falsely representing the key as the intended receiver's public key (250). The sender receives the conflicting keys (260) and chooses the false public key to encrypt and send the message (270). Thus, the intended receiver cannot read the message (280) if passed along network path B, and the false receiver can read the message (290) if passed along network path C.

The ultimate purpose of key management is to assure its users that they are securely communicating with whom they want to communicate, and nobody else. A user of the framework must be able to get satisfying answers to the following questions:

Is the person or service I am talking to really the one it claims to be?

Is there somebody in the middle, relaying everything?

How sure can I be about this?

Public key infrastructures (PKIs) provide a satisfactory answer to the above three questions. Most currently deployed PKIs use centralized and hierarchical models for their trust computations.

Hierarchical Trust Communication

FIG. 3 illustrates the structure of one embodiment of a traditional hierarchically organized PKIs. Node A links to nodes B and C. Node B links to nodes D, E, F, G and H. Node C links to nodes I, J, K, L and M. Each node represents a participant of the network, and each arrow indicates a link from a certificate authority to a participant. Nodes A, B and C form a small hierarchy of certificate authorities which sign public keys. Node A is the root of the certificate authority hierarchy. A key verified as signed by a certificate authority is trusted to be correct. Thus, peers can easily verify message authenticity and communicate securely.

FIG. 4 illustrates a process for a secure communication utilizing a traditional hierarchically organized PKI. At step 400, peer 2 presents a certificate authority with a public key and convinces the certificate authority the binding of that public key to peer 2 is correct. For example, a certificate authority may require peer 2 to go appear at the certificate authority in person with appropriate documents. At step 410, the certificate authority signs peer 2's public key and returns it to peer 2. At step 420, peer 1 receives the certificate authority's public key through a secure channel. For example, the certificate authority's public key is often embedded in a web browser application such as Netscape or Internet Explorer.

At step 430, peer 2 makes its signed public key available from a database. At step 440, peer 1 requests peer 2's public key from a database. At step 450, peer 1 verifies the signature on peer 2's public key using the certificate authority's public key. At step 460, peer 1 encrypts a message using peer 2's public key. At step 470, peer 1 sends the encoded message to peer 2. At step 480, peer 2 uses its private key to decrypt the message. Since peer 1 verified peer 2's public key using the certificate authority's public keey, peer 1 can be sure the message can only be read by peer 2.

Current Data Delivery Systems

As outlined above, current data delivery systems might be made secure, but they suffer various disadvantages. A first disadvantage is that data is not automatically delivered when the data is updated, for instance, in the case of data critical applications such as remote surgery. In addition, the updates must also be secure. Second, the update must be accessible by only the right people and there is no way to control this using current schemes. Finally, the recipients of the data must gain access to the data irrespective of the computing environment they use. Currently, there is no data delivery system that solves any of these three problems.

SUMMARY OF THE INVENTION

The present invention is related to securely and autonomously synchronizing data in a distributed computing environment, for instance where multiple computers are at geographically disparate locations. In one embodiment of the present invention, data is distributed from a central server to one or more geographically distributed clients. In another embodiment, data is encrypted and securely transmitted over a computer network. One embodiment uses the Secure Sockets Layer protocol to secure transmitted data. In this embodiment, the data is transmitted via the Internet.

In another embodiment of the present invention, data is distributed in real-time. In this embodiment, data is provided to a user as the data updates without the user making a specific request for updated data. In another embodiment, portions of data are made available to only authorized users. In this embodiment an administrator sets permissions to control which data is transmitted to a user.

In another embodiment, the transmission of data is secure bi-directionally. In this embodiment, data transmitted to a user from a central location is secure and data transmitted to a central location from a user is secure. In yet another embodiment, data is securely transmitted to a user independent of the platform on the user's machine. In this embodiment, the software that controls the data delivery system is written in a platform independent programming language, such as Java.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to securely and autonomously synchronizing data on geographically distributed computers. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Figure 1:
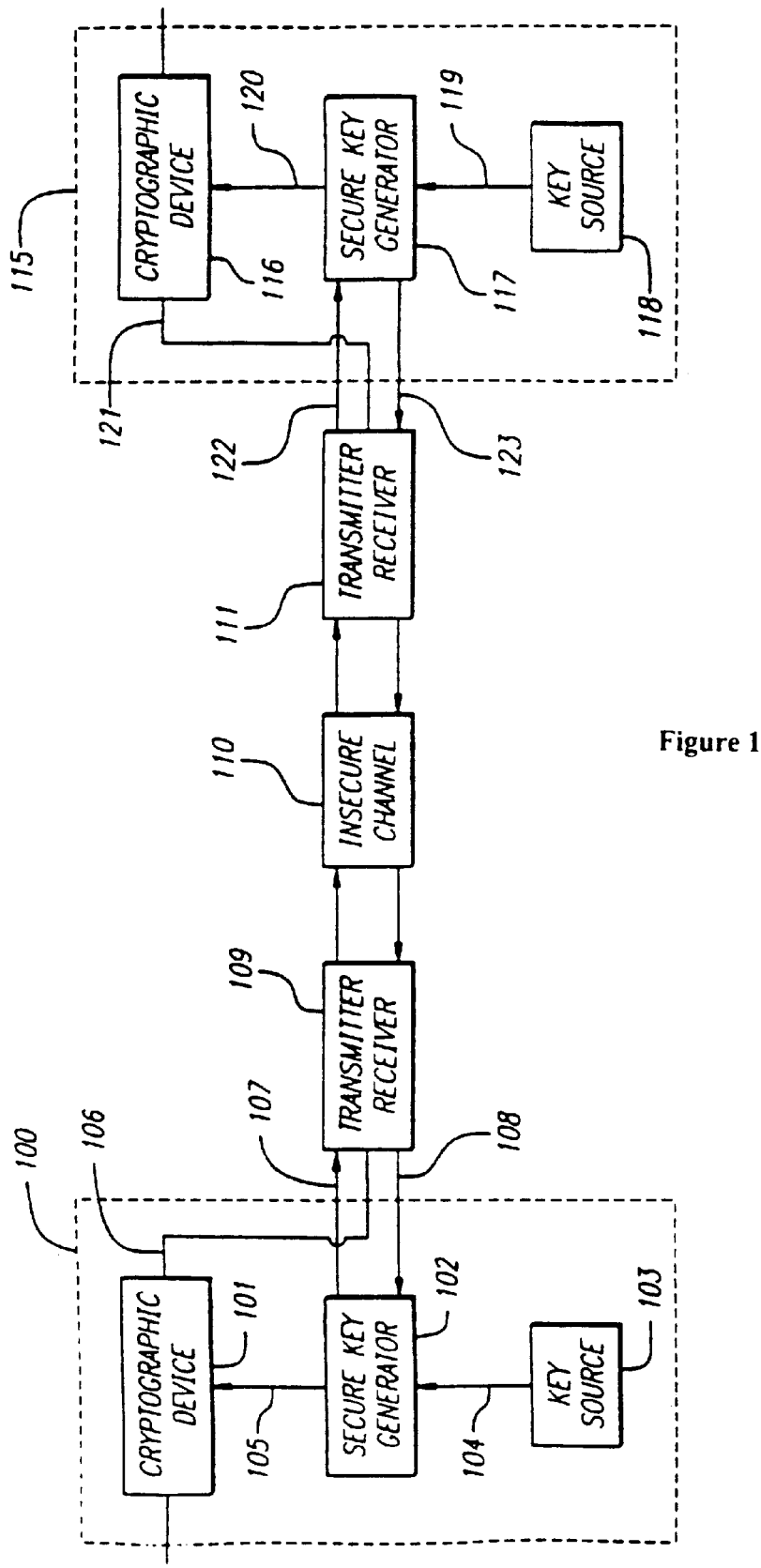
FIG. 1 is a block diagram of a prior art public key exchange system.
Figure 2:
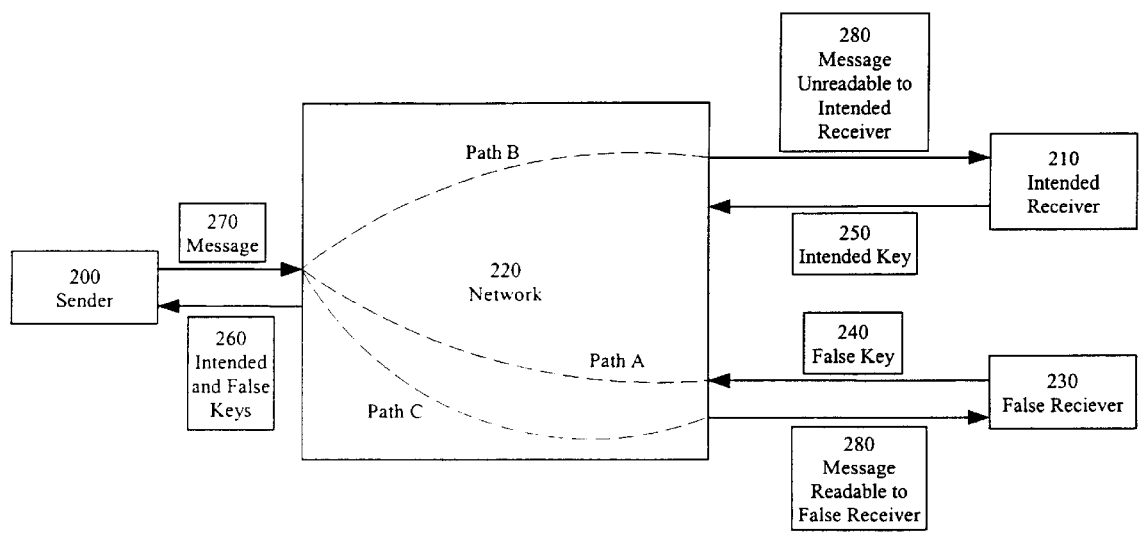
FIG. 2 is a block diagram of a failed secure transaction attempt.
Figure 3:
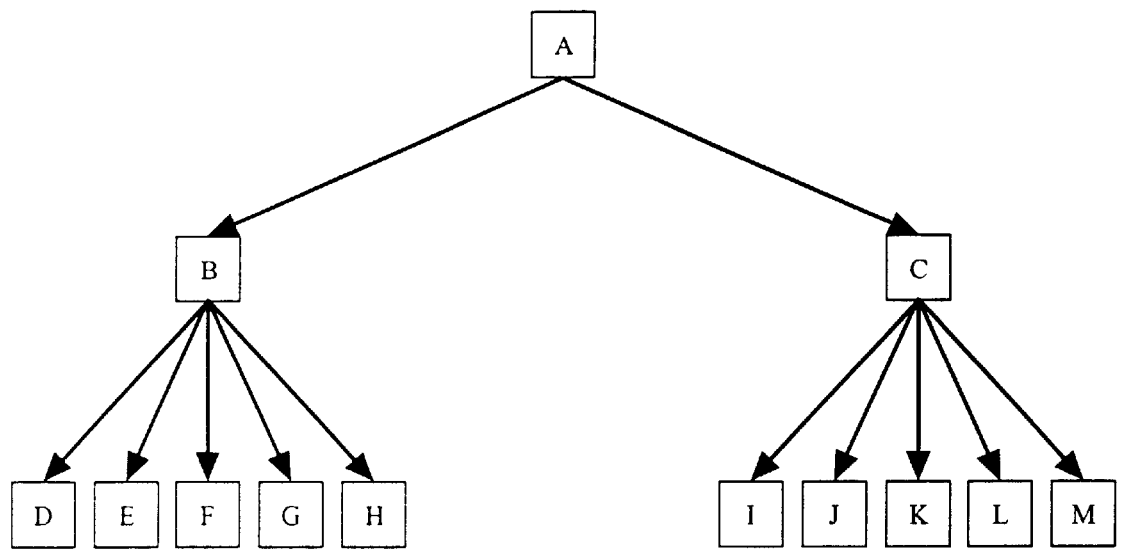
FIG. 3 is a block diagram of one embodiment of a traditional hierarchically organized trust structure.
Figure 4:
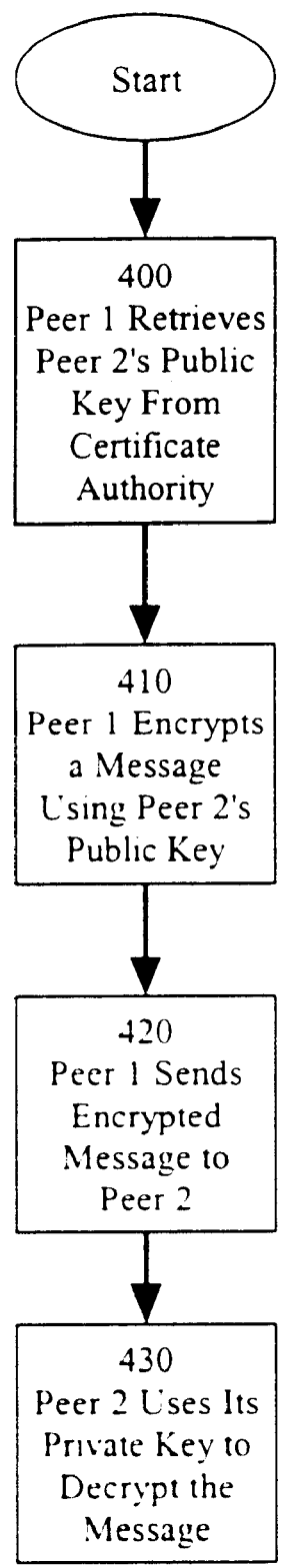
FIG. 4 is a flow diagram of a process for a secure communication in accordance with a traditional hierarchically organized trust structure.
Figure 5:
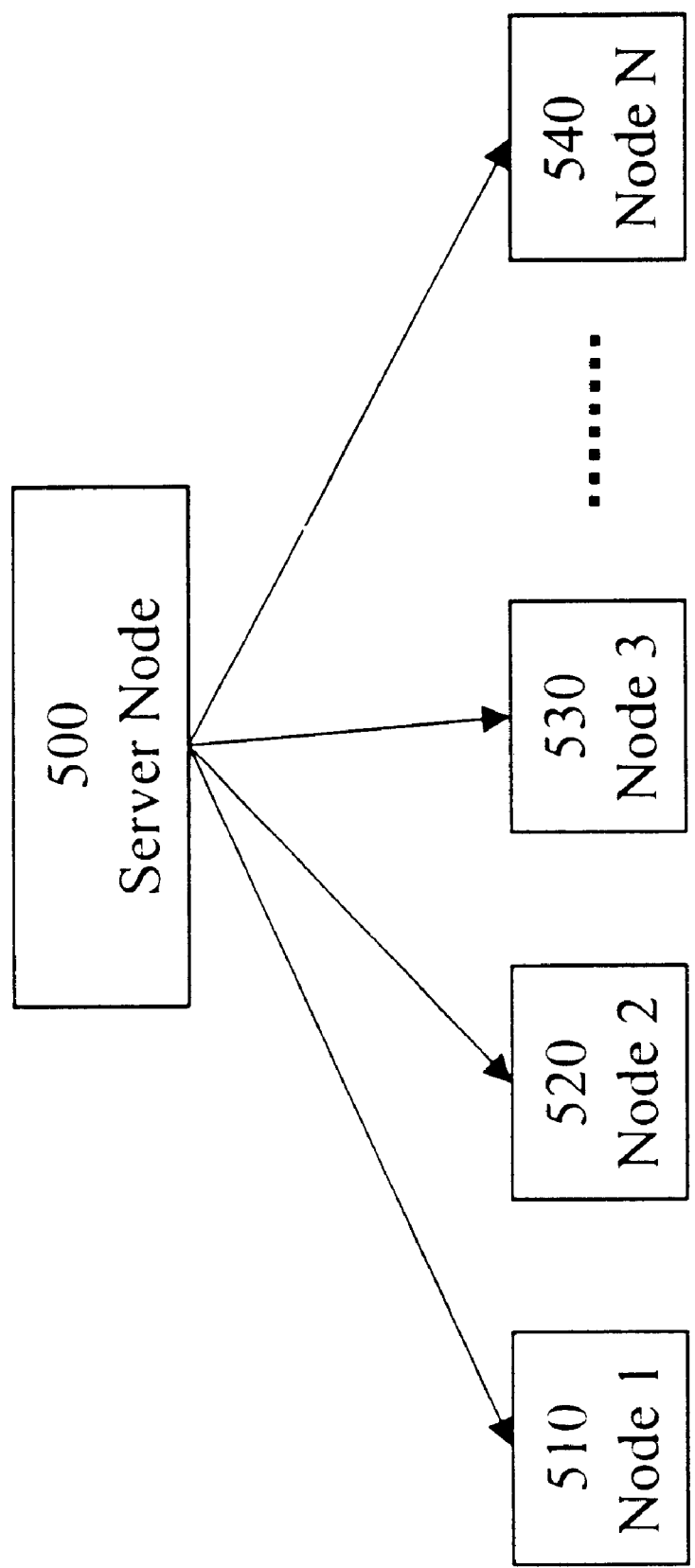
FIG. 5 is a block diagram of one embodiment of the present invention.

In one embodiment of the present invention, data is distributed from a central server to geographically distributed clients without encryption. This embodiment enables distributed users to collaboratively view a shared data set with little setup time or administration of the distribution system. FIG. 5 illustrates one embodiment of the present invention. The Server Node (500) servers as a central server. Shared data is distributed from the Server Node to Nodes 1 (520), 2 (520), 3 (530) and N (540).

Figure 6:
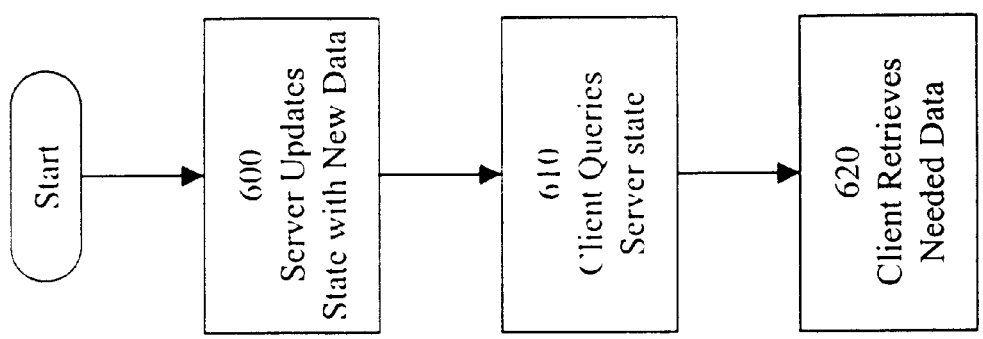
FIG. 6 is a flow diagram of the process of automatic data distribution in accordance with one embodiment of the present invention.

FIG. 6 illustrates the process of automatic data distribution in accordance with one embodiment of the present invention. At step 600, the server automatically detects new data locally and updates its state. At step 610, a clients contacts the server and requests the current state of the server. At step 620, the client determines the files it needs to synchronize its state with the server and requests those files. This "pull model" reduces the load on the server by requiring the clients to perform the necessary work for synchronization.

Figure 7:
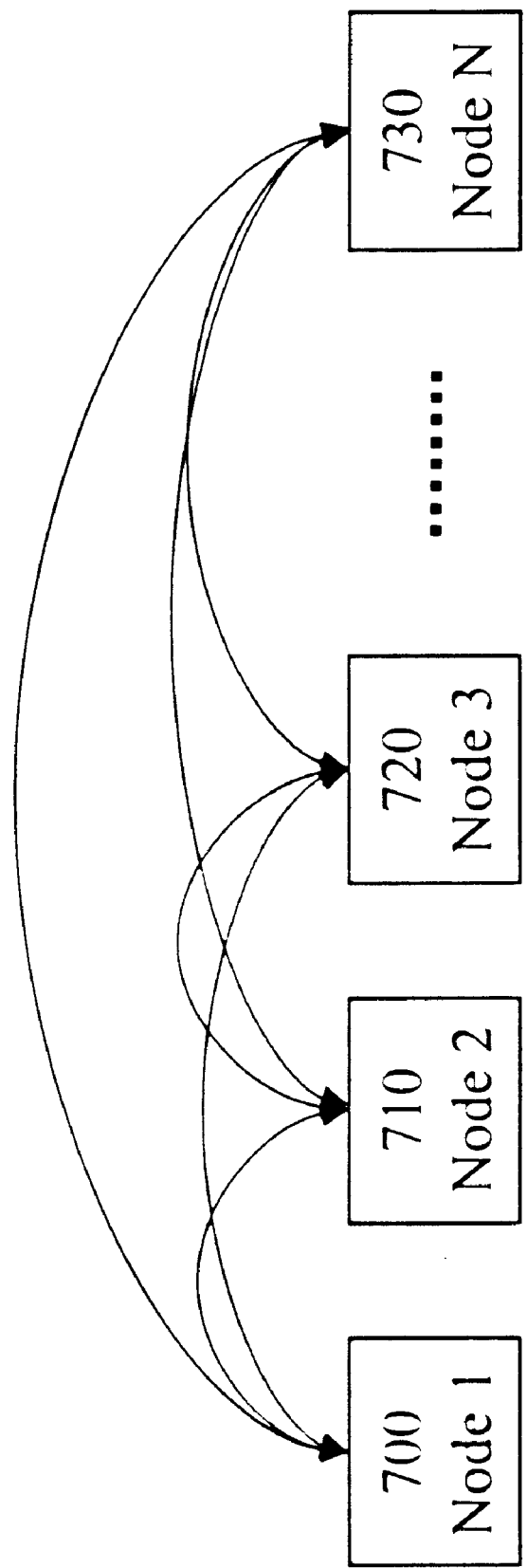
FIG. 7 is a block diagram of one embodiment of the present invention.

FIG. 7 illustrates another embodiment of the present invention, in which data is replicated autonomously in a peer-to-peer fashion between all nodes. This eliminates the need for a centralized server and allows all clients to edit the shared data. Nodes 1 (700), 2 (710), 3 (720), and N (730) are all capable of transmitting data to the other nodes.

Figure 8:
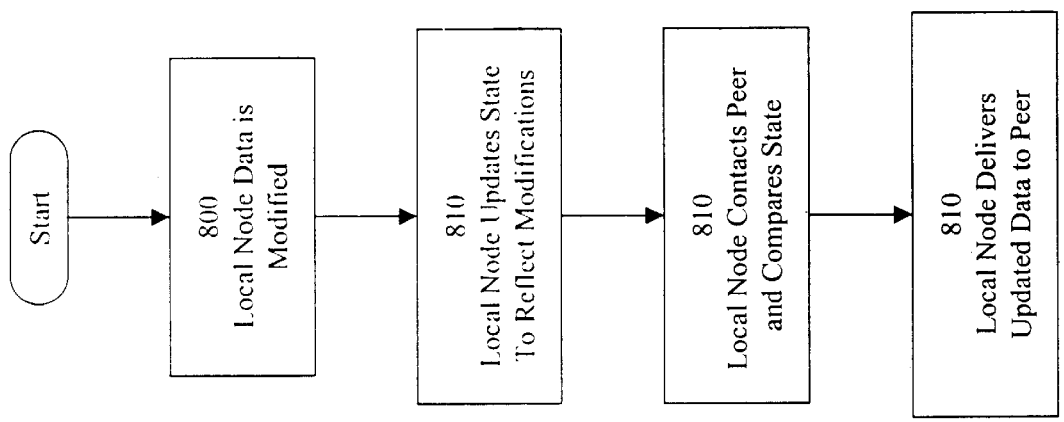
FIG. 8 is a flow diagram of the process of automatic data distribution in accordance with one embodiment of the present invention.

FIG. 8 illustrates the process of automatic data distribution in accordance with one embodiment of the present invention. At step 800, local node data is modified. At step 810, the local node updates its state to reflect the modifications. At step 820, the local node contacts its peers and compares states. At step 830, the local node delivers updated data to is peers.

Figure 9:
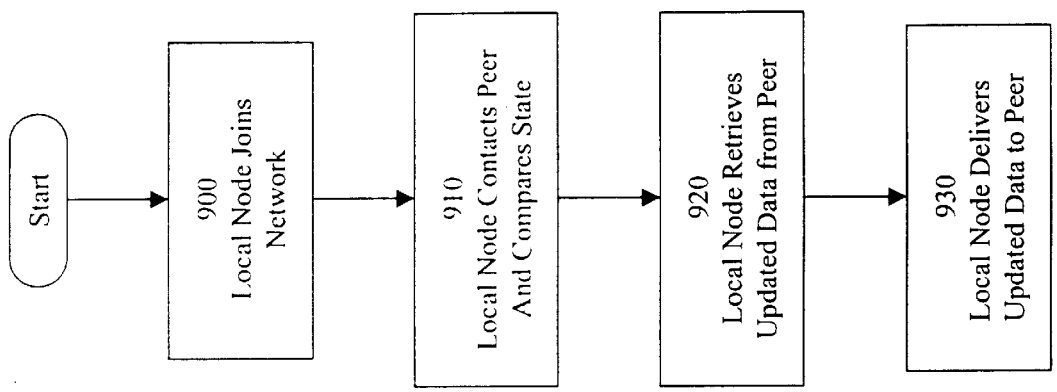
FIG. 9 is a flow diagram of the process of automatic data distribution in accordance with one embodiment of the present invention.

FIG. 9 illustrates the process of automatic data distribution in accordance with one embodiment of the present invention. At step 900, a local node joins the network. At step 910, the local node contacts a peer and compares states. At step 920, the local node retrieves updated data from the peer. At step 930, the local node delivers updated data to the peer.

Figure 10:
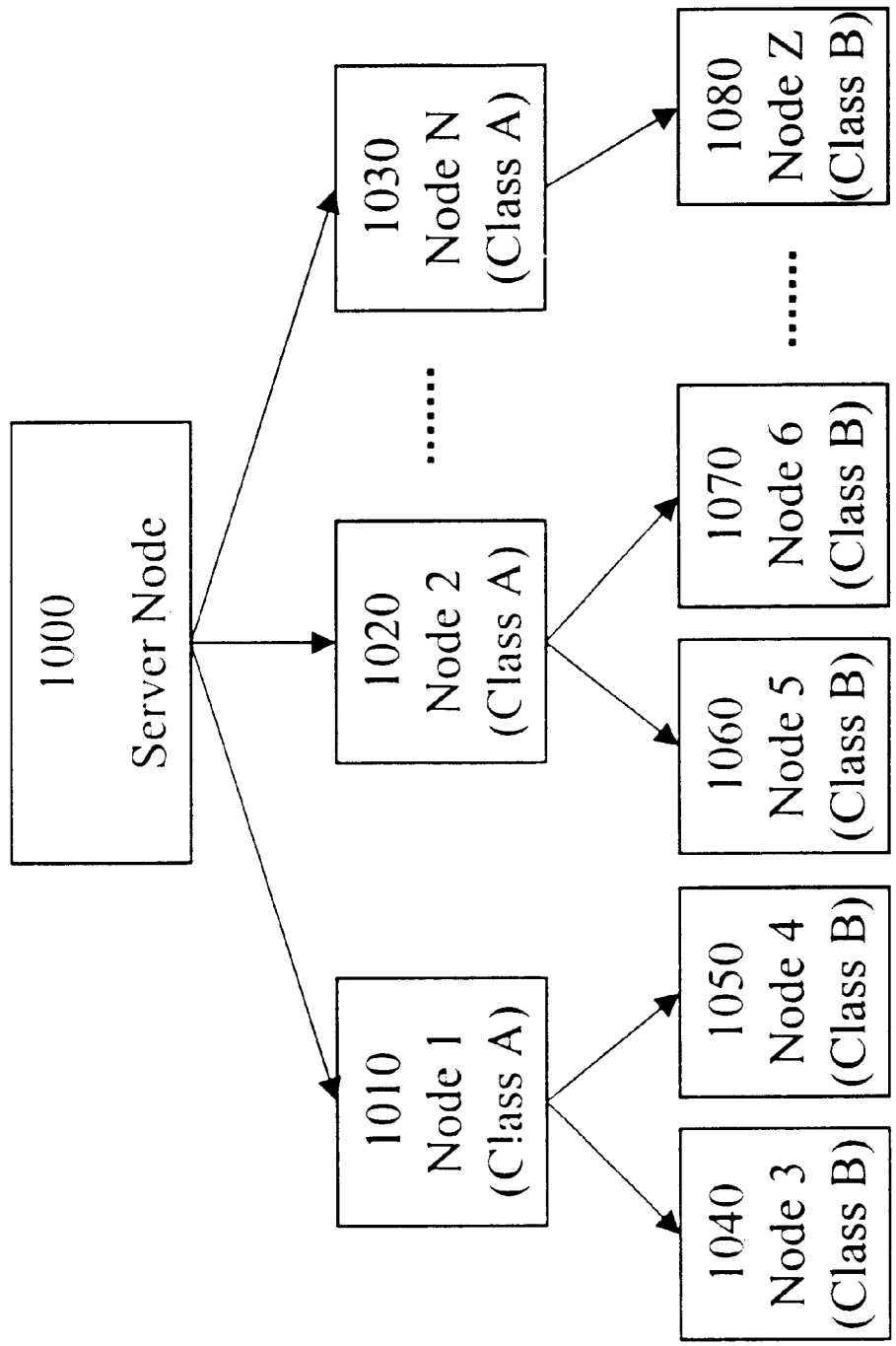
FIG. 10 is a block diagram of one embodiment of the present invention.

FIG. 10 depicts another embodiment of the present invention, which draws upon elements of the peer-to-peer and server-client techniques employed in the prior embodiments. Nodes 3 (1040), 4 (1050), 5 (1060), 6 (1070) and Z (1080) are labeled as "Class B Nodes" and are grouped into local server-client groups with a "Class A Node" acting as the local server. Node 1 (1010) is a "Class A Node" which serves as a local server for Nodes 3 and 4. Node 2 (1020) is a "Class A Node" which serves as a local server for Nodes 5 and 6. Node N (1030) is a "Class A Node" which serves as a local server for Node Z. Nodes 1, 2 and N all communicated with the Server Node (1000).

Figure 11:
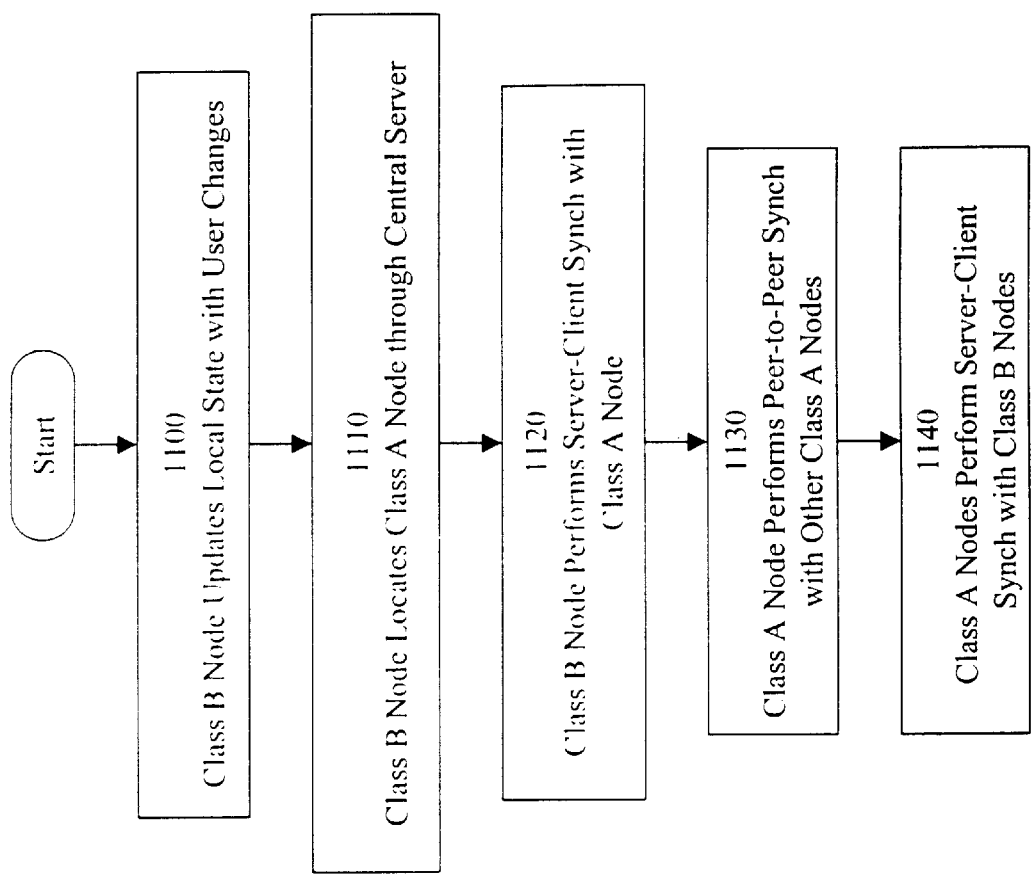
FIG. 11 is a flow diagram of the process of automatic data distribution in accordance with one embodiment of the present invention.

FIG. 11 illustrates the process of automatic data distribution in accordance with one embodiment of the present invention. At step 1100, a class B node updates its local state with user changes. At step 1110, the class B node locates a class A node through the central server. At step 1120, the class B node performs a server-client synch with the class A node. At step 1130, the class A node performs a peer-to-peer synch with the other class A nodes. At step 1140, the class A nodes perform server-client synchs with the class B nodes. This embodiment accomplishes efficient synchronization and distributed editing of the data.

Figure 12:
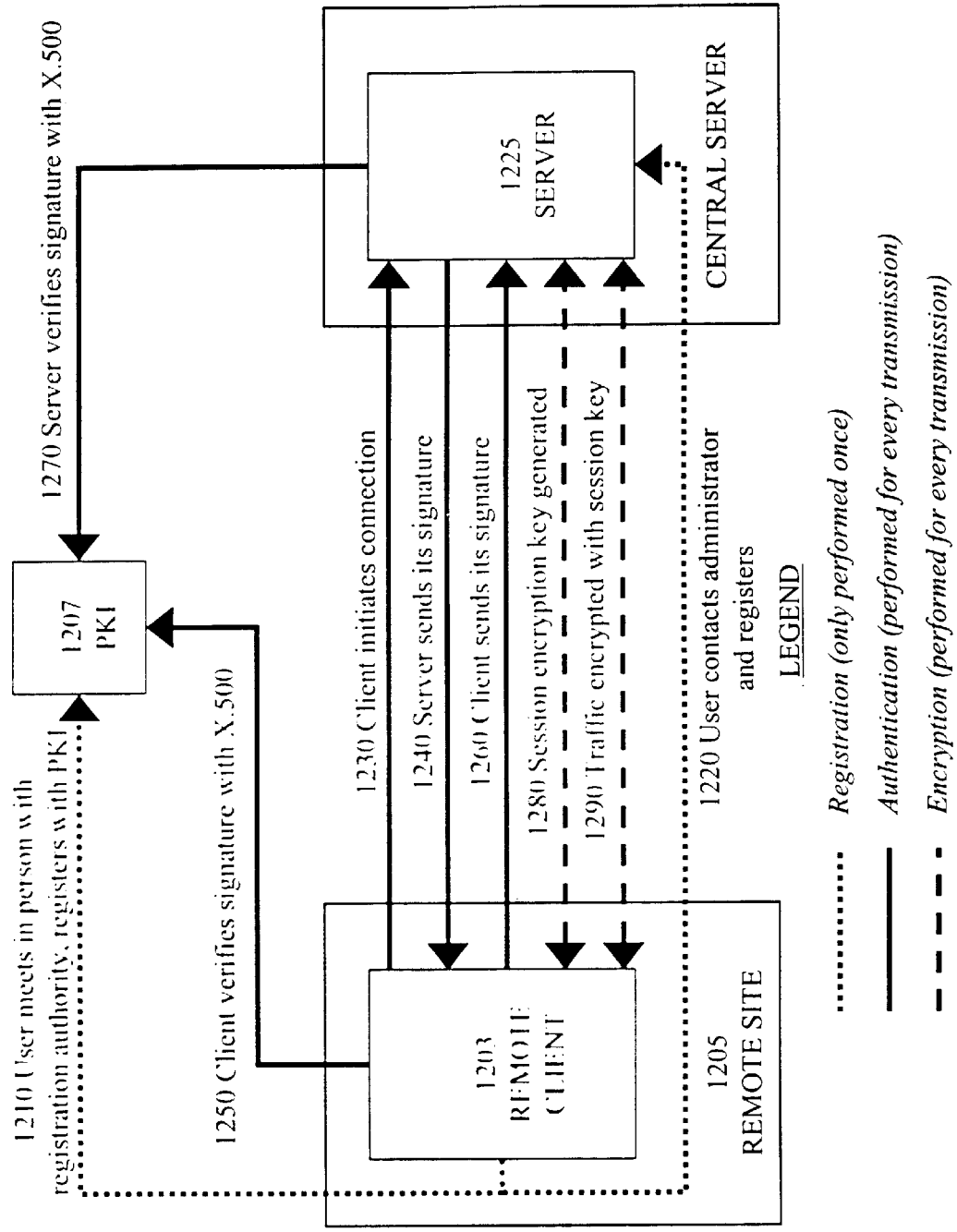
FIG. 12 is a block diagram of the process used to establish a secure connection in accordance with one embodiment of the present invention.

The present invention can apply an aggressive authentication and encryption model to the above embodiments to make any of them operate in a secure fashion. FIG. 12 illustrates the process used to establish a secure connection in accordance with one embodiment of the present invention. The steps can be broken down into three parts: Registration, Authentication, and Encryption.

In this embodiment, every user of the invention at a remote site (1205) must have two things to initiate any connection to the server (1225): a certificate disk, and the password to that certificate disk. The certificate disk contains the user's private signing key and private encryption key, which are needed to positively prove that user's identity to the server over the Internet. The disk alone can not be used to connect to the server without the user's password, and the user's password is useless without the certificate disk. The certificate disk is a 3.5" floppy disk, and the user is instructed to keep the disk in a secure place and never place its files onto a hard drive. The technology is also available to record the certificate onto a "smart card", which acts exactly like the floppy certificate disk except that the data on the smart card can not be easily copied from the card.

In order to receive a certificate disk, a remote user must go through a registration process, shown in steps 1210 and 1220. At step 1210, they must appear, in person, at a security office. They provide two forms of identification to a specially trained "registration authority" (RA), who confirms their identity and gives them two numbers that can be used to create the certificate disk. In the generation of the certificate disk, the user specifies a password. Once this process is complete, information is placed in an online X.500 directory that the server will use to verify the identity of the remote client (1203) in the Authentication stage.

Next, the user must contact the mission system administrator, who instructs the server to allow that user remote access. Note that the server is also issued a certificate disk by the Public Key Infrastructure (PKI) (1207), which it uses to prove its identity to remote users.

Steps 1230 through 1290 are repeated for every transmission from the client to the server or from the server to the client. In steps 1230 through 1270, the server and client exchange digital "signatures", which they generate from the data on their certificate disks. At step 1230, the client initiates a connection with the server. At step 1240, the server sends its signature to the client. At step 1250, the client verifies the signature by communicating with the X.500 directory. At step 1260, the client sends its signature to the server. At step 1270, the server verifies the signature by communicating with the X.500 directory. This process, an adaptation of SSL authentication, relies on the fact that it is nearly impossible for someone to generate another user's digital signature without that user's certificate disk and password. In order for an unauthorized user gain access to the server, he must either steal a legitimate user's certificate disk and password, or compromise the certificate authority (CA), the system that issues certificates to users. The CA is highly protected. A more detailed description of the SSL authentication process is found online in the Netscape Corporation's specification for the SSL algorithm.

At step 1280, the last step in establishing a connection, the client and server generate a unique symmetric encryption key set that will be used in the Triple-DES-EDE3 encryption algorithm to encrypt the traffic for this transaction. This encryption key is decided upon using the Diffie-Hellman key agreement protocol, which is an algorithm that allows two parties to agree upon a secret encryption key without ever transmitting that key in clear-text over the Internet. After an encryption key has been agreed upon, at step 1290, all subsequent traffic for this transaction is encrypted. This encryption makes transactions invulnerable to eavesdropping or "packet-sniffing" attacks. To increase the security of the transmissions, a new encryption key protects every subsequent transaction. Even if an attacker managed to compromise an encryption key (a highly unlikely accomplishment), he would only have access to the data in a single transmission.

In another embodiment of the present invention, real-time communication between third-party applications is protected. In this embodiment, the application communicates with the invention via a defined API (Application Programming Interface) that enables it to access the security functions of the invention. This allows the present invention to provide a secure communications capability to a third party application.

In an additional embodiment, the present invention allows an administrator to control which data is each user of the system can access. For example, scientist 1 on a NASA project has clearance to receive data set A, scientist 2 has clearance to receive data set B, and scientist 3 has clearance to receive data sets A and B. An administrator instructs the system to securely send updates of data set A to scientists 1 and 3. Likewise, the administrator instructs the system to securely send updates of data set B to scientists 2 and 3.

Figure 13:
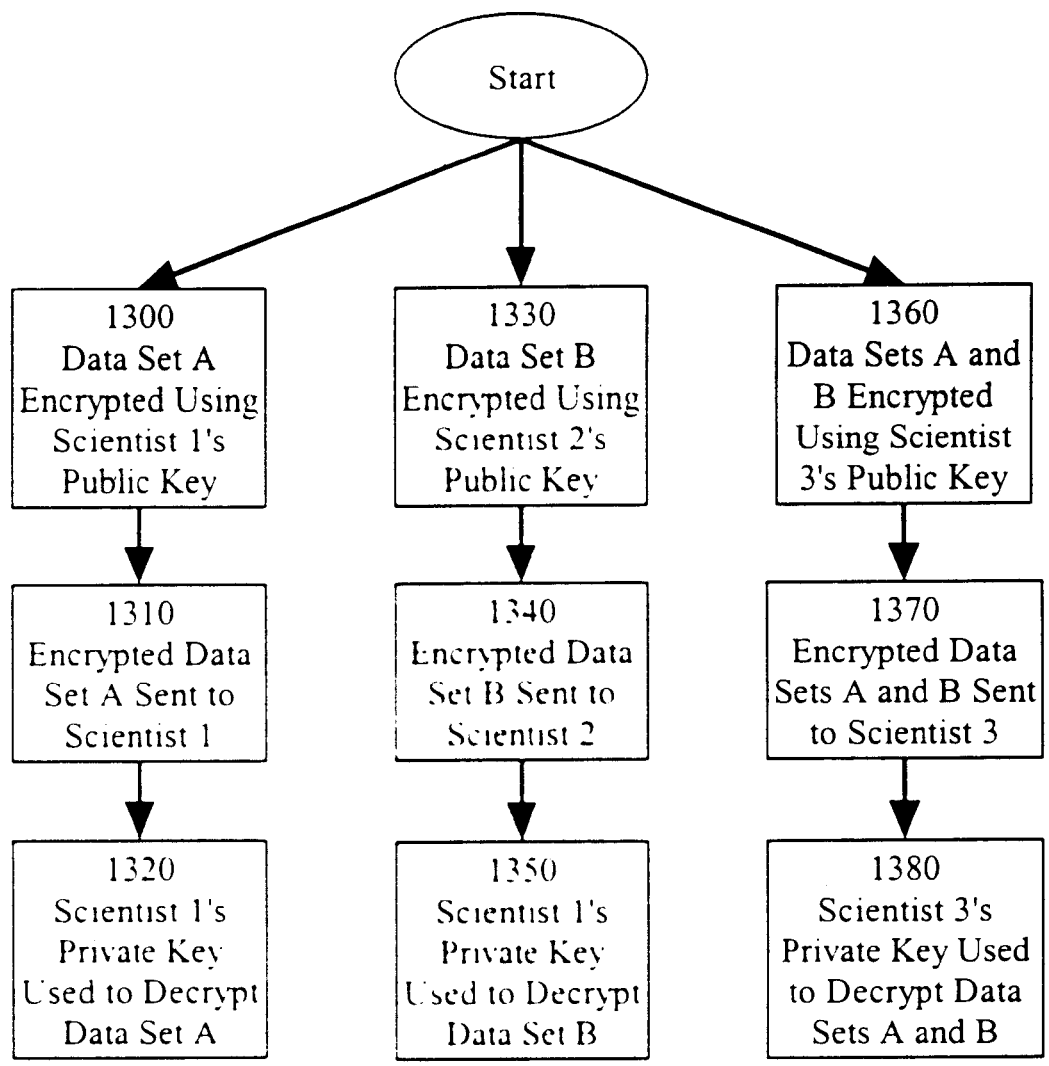
FIG. 13 is a flow diagram of the process of securely distributing data in the above scenario in accordance with one embodiment of the present invention.

FIG. 13 illustrates the process of securely distributing data in the above scenario in accordance with one embodiment of the present invention. The parallel processes of transmitting data to Scientists 1, 2 and 3 begin at steps 1300, 1330 and 1360, respectively. At step 1300, data set A is encrypted using scientist 1's public key. At step 1310, the encrypted data set A is sent to scientist 1. At step 1320, scientist 1's private key is used to decrypt data set A. At step 1330, data set B is encrypted using scientist 2's public key. At step 1340, the encrypted data set B is sent to scientist 2. At step 1350, scientist 2's private key is used to decrypt data set B. At step 1360, data sets A and B are encrypted using scientist 3's public key. At step 1370, the encrypted data sets A and B are sent to scientist 3. At step 1380, scientist 3's private key is used to decrypt data sets A and B.

Figure 14:
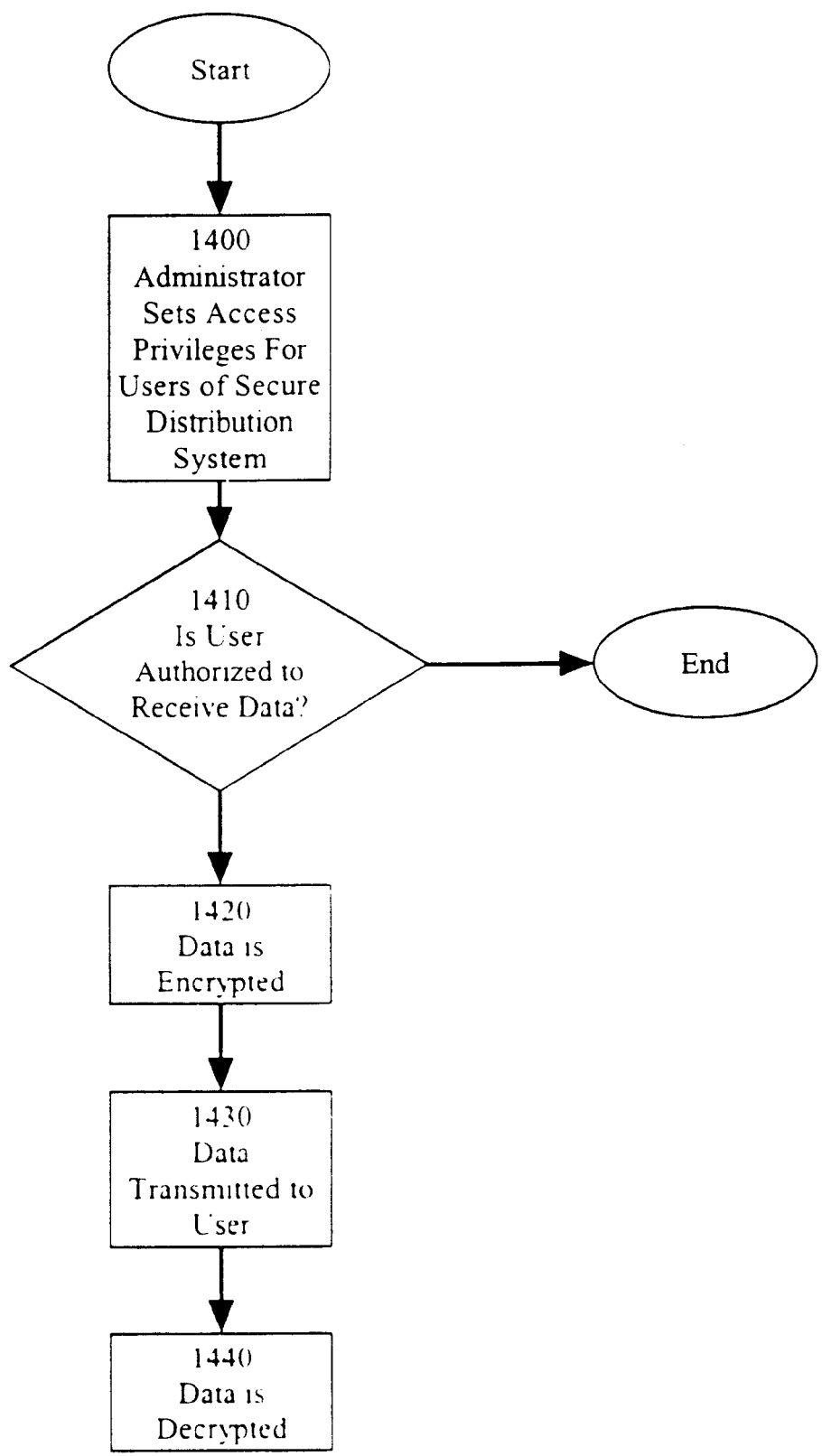
FIG. 14 is a flow diagram of the process of controlled, secure data distribution in accordance with one embodiment of the present invention.

FIG. 14 further illustrates the process of controlled, secure data distribution in accordance with this embodiment of the present invention. At step 1400, an administrator sets access privileges for users of the secure distribution system. At step 1410, it is determined whether a user is authorized to receive the data. If the user is not authorized to see the data, the process ends. If the user is authorized to see the data, at step 1420, the data is encrypted. At step 1430, the data is transmitted to the user. At step 1440, the data is decrypted.

Figure 15:
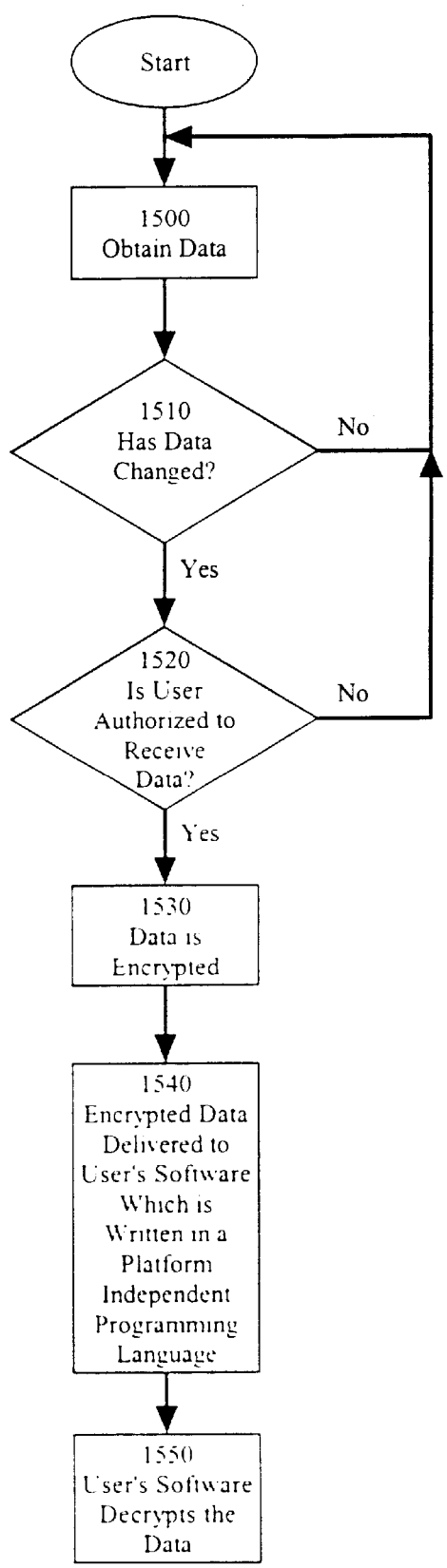
FIG. 15 is a flow diagram of the process of secure data distribution in accordance with one embodiment of the present invention.

In yet another embodiment, data is securely transmitted to a user independent of the platform on the user's machine. Thus, a user may receive or transmit data securely while using one of a number of computer platforms. Some examples of platforms include Windows '95, Windows '98, Windows NT, the Palm OS, the Mac OS, Linix and Unix. One embodiment is implemented using a platform independent programming language such as Java. The operation of this embodiment is illustrated in FIG. 15.

At step 1500, data is obtained. At step 1510, it is determined whether the data has changed. If the data has not changed, the process repeats at step 1500. If the data has changed, at step 1520, it is determined whether a user is authorized to receive the data. If the user is not authorized to receive the data, the process repeats at step 1500. If the user is authorized to receive the data, at step 1530, the data is encrypted. At step 1540, the encrypted data is delivered to the user's software which is written in a platform independent programming language. At step 1550, the user's software decrypts the data.

Figure 16:
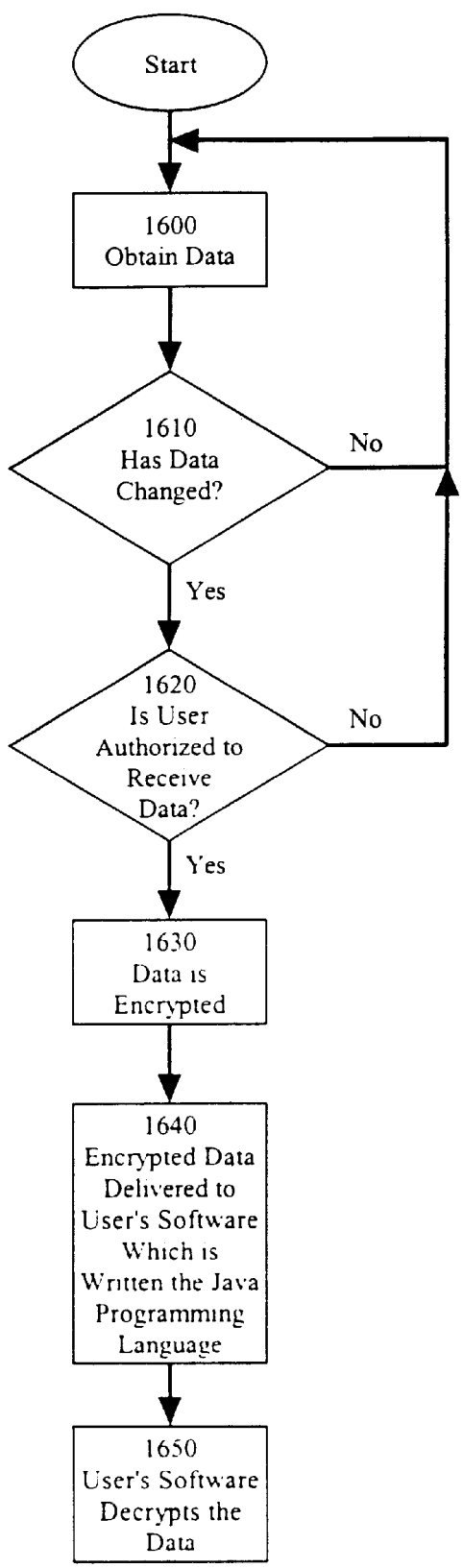
FIG. 16 is a flow diagram of the process of secure data distribution in accordance with one embodiment of the present invention.

FIG. 16 illustrates the process of secure data distribution in accordance with one embodiment of the present invention. At step 1600, data is obtained. At step 1610, it is determined whether the data has changed. If the data has not changed, the process repeats at step 1600. If the data has changed, at step 1620, it is determined whether a user is authorized to receive the data. If the user is not authorized to receive the data, the process repeats at step 1600. If the user is authorized to receive the data, at step 1630, the data is encrypted. At step 1640, the encrypted data is delivered to the user's software which is written in the Java programming language. At step 1650, the user's software decrypts the data.

Embodiment of Computer Execution Environment (Hardware)

Figure 17:
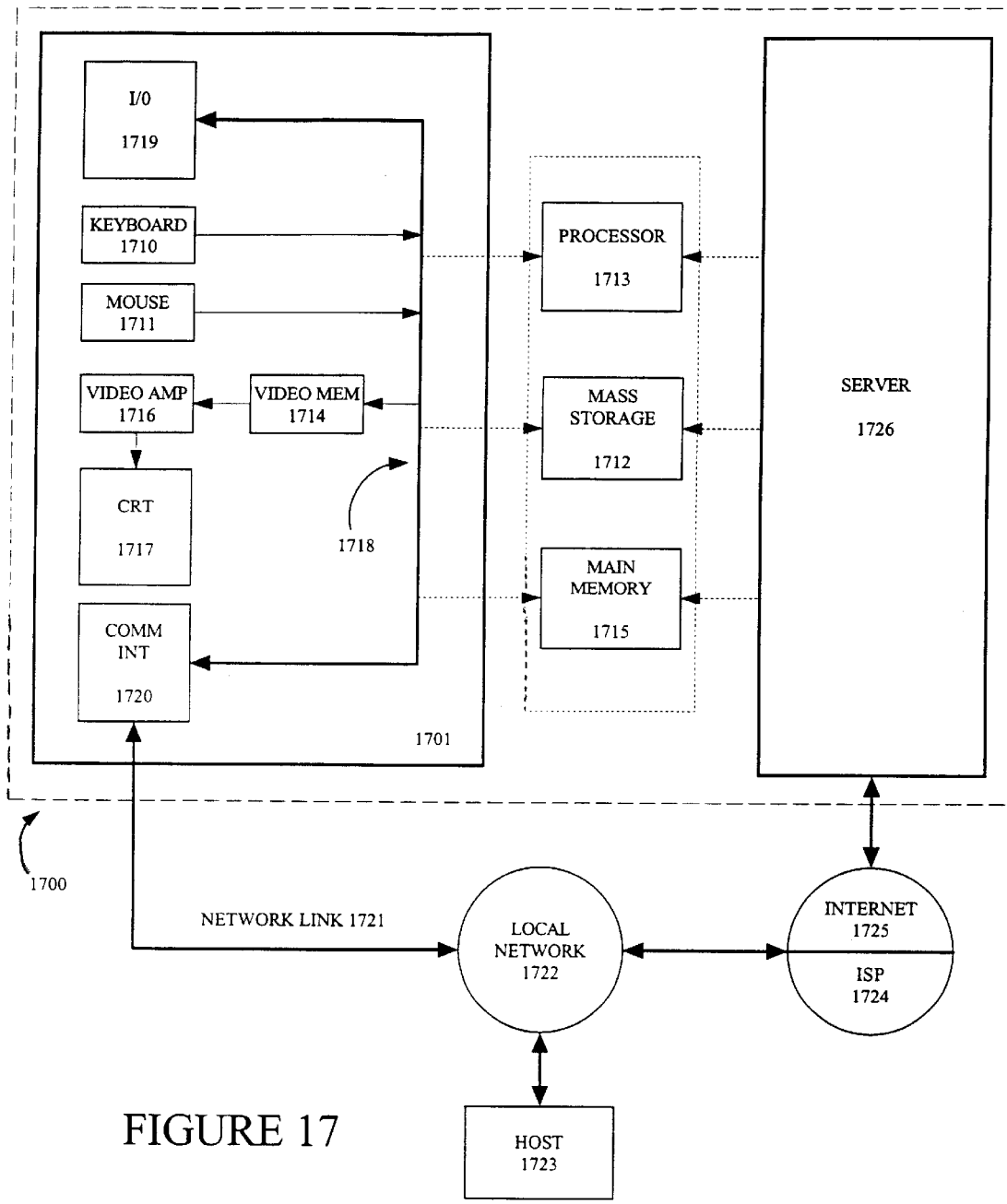
FIG. 17 is a block diagram a general purpose computer.

An embodiment of the invention can be implemented as computer software in the form of computer readable program code executed in a general purpose computing environment such as environment 1700 illustrated in FIG. 17, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1710 and mouse 1711 are coupled to a system bus 1718. The keyboard and mouse are for introducing user input to the computer system and communicating that user input to central processing unit (CPU) 1713. Other suitable input devices may be used in addition to, or in place of, the mouse 1711 and keyboard 1710. I/O (input/output) unit 1719 coupled to bi-directional system bus 1718 represents such I/O elements as a printer, A/V (audio/video) I/O, etc.

Computer 1701 may include a communication interface 1720 coupled to bus 1718. Communication interface 1720 provides a two-way data communication coupling via a network link 1721 to a local network 1722. For example, if communication interface 1720 is an integrated services digital network (ISDN) card or a modem, communication interface 1720 provides a data communication connection to the corresponding type of telephone line, which comprises part of network link 1721. If communication interface 1720 is a local area network (LAN) card, communication interface 1720 provides a data communication connection via network link 1721 to a compatible LAN. Wireless links are also possible. In any such implementation, communication interface 1720 sends and receives electrical, electromagnetic or optical signals which carry digital data streams representing various types of information.

Network link 1721 typically provides data communication through one or more networks to other data devices. For example, network link 1721 may provide a connection through local network 1722 to local server computer 1723 or to data equipment operated by ISP 1724. ISP 1724 in turn provides data communication services through the world wide packet data communication network now commonly referred to as the "Internet" 1725. Local network 1722 and Internet 1725 both use electrical, electromagnetic or optical signals which carry digital data streams. The signals through the various networks and the signals on network link 1721 and through communication interface 1720, which carry the digital data to and from computer 1700, are exemplary forms of carrier waves transporting the information.

Processor 1713 may reside wholly on client computer 1701 or wholly on server 1726 or processor 1713 may have its computational power distributed between computer 1701 and server 1726. Server 1726 symbolically is represented in FIG. 17 as one unit, but server 1726 can also be distributed between multiple "tiers". In one embodiment, server 1726 comprises a middle and back tier where application logic executes in the middle tier and persistent data is obtained in the back tier. In the case where processor 1713 resides wholly on server 1726, the results of the computations performed by processor 1713 are transmitted to computer 1701 via Internet 1725, Internet Service Provider (ISP) 1724, local network 1722 and communication interface 1720. In this way, computer 1701 is able to display the results of the computation to a user in the form of output.

Computer 1701 includes a video memory 1714, main memory 1715 and mass storage 1712, all coupled to bi-directional system bus 1718 along with keyboard 1710, mouse 1711 and processor 1713. As with processor 1713, in various computing environments, main memory 1715 and mass storage 1712, can reside wholly on server 1726 or computer 1701, or they may be distributed between the two. Examples of systems where processor 1713, main memory 1715, and mass storage 1712 are distributed between computer 1701 and server 1726 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 1712 may include both fixed and removable media, such as magnetic, optical or magnetic optical storage systems or any other available mass storage technology. Bus 1718 may contain, for example, thirty-two address lines for addressing video memory 1714 or main memory 1715. The system bus 1718 also includes, for example, a 32-bit data bus for transferring data between and among the components, such as processor 1713, main memory 1715, video memory 1714 and mass storage 1712. Alternatively, multiplex data/address lines may be used instead of separate data and address lines.

In one embodiment of the invention, the processor 1713 is a SPARC microprocessor from Sun Microsystems, Inc., a microprocessor manufactured by Motorola, such as the 680X0 processor, or a microprocessor manufactured by Intel, such as the 80X86 or Pentium processor. However, any other suitable microprocessor or microcomputer may be utilized. Main memory 1715 is comprised of dynamic random access memory (DRAM). Video memory 1714 is a dual-ported video random access memory. One port of the video memory 1714 is coupled to video amplifier 1716. The video amplifier 1716 is used to drive the cathode ray tube (CRT) raster monitor 1717. Video amplifier 1716 is well known in the art and may be implemented by any suitable apparatus. This circuitry converts pixel data stored in video memory 1714 to a raster signal suitable for use by monitor 1717. Monitor 1717 is a type of monitor suitable for displaying graphic images.

Computer 1701 can send messages and receive data, including program code, through the network(s), network link 1721, and communication interface 1720. In the Internet example, remote server computer 1726 might transmit a requested code for an application program through Internet 1725, ISP 1724, local network 1722 and communication interface 1720. The received code may be executed by processor 1713 as it is received, and/or stored in mass storage 1712, or other non-volatile storage for later execution. In this manner, computer 1700 may obtain application code in the form of a carrier wave. Alternatively, remote server computer 1726 may execute applications using processor 1713, and utilize mass storage 1712, and/or video memory 1715. The results of the execution at server 1726 are then transmitted through Internet 1725, ISP 1724, local network 1722 and communication interface 1720. In this example, computer 1701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, secure and autonomous synchronizing of data on geographically distributed computers is described in conjunction with one or more specific embodiments. The invention is defined by the following claims and their full scope of equivalents.

What is claimed is:

1. A method for autonomous, secure data synchronization comprising:
    storing a local state of a shared data item wherein said local state is stored at a first location;
    detecting a difference between said local state and a second state of said shared data item wherein said second state is located at a second location wherein said first location and said second location are connected by a computer network;
    synchronizing said local state and said second state; and
    distributing said shared data item between said first location and said second location in real-time.

2. The method of claim 1 wherein said step of detecting comprises:
    securing a communication wherein said communication is between said first location and said second location.

3. The method of claim 2 wherein said step of securing comprises:
    encrypting said communication.

4. The method of claim 2 wherein said step of securing comprises:
    authenticating said communication.

5. The method of claim 2 wherein said step of securing comprises:
    using a Secure Sockets Layers protocol.

6. The method of claim 1 wherein said step of synchronizing comprises:
    securing a communication wherein said communication is between said first location and said second location.

7. The method of claim 6 wherein said step of securing comprises:
    encrypting said communication.

8. The method of claim 6 wherein said step of securing comprises:
    authenticating said communication.

9. The method of claim 6 wherein said step of securing comprises:
    using a Secure Sockets Layers protocol.

10. The method of claim 1 wherein said computer network is the Internet.

11. The method of claim 1 further comprising:
    disconnecting said first location from said computer network wherein said step of disconnecting does not alter a consistency requirement of said shared data.

12. The method of claim 11 further comprising:
    reconnecting said first location to said computer network wherein said step of reconnecting does not alter said consistency requirement of said shared data.

13. The method of claim 1 wherein said steps of storing, detecting and synchronizing are performed without a human request for an action.

14. The method of claim 1 further comprising:
    determining a set of users wherein said set are authorized to receive said shared data; and
    encrypting said shared data wherein only a member of said set is able to decrypt said shared data.

15. The method of claim 1 further comprising:
    ensuring said shared data is not distributed to a user wherein said user is not authorized to access said shared data.

16. The method of claim 1 wherein said shared data is modified at said first location.

17. The method of claim 16 wherein said step of synchronizing comprises:

modifying said second state to match said local state.

18. The method of claim 1 wherein said shared data is modified at said second location.

19. The method of claim 18 wherein said step of synchronizing comprises:
   modifying said local state to match said second state.

20. The method of claim 1 further comprising:
   enabling said first location to receive said data item independent of a platform used at said first location.

21. The method of claim 20 wherein said step of enabling comprises:
   using a version of the Java programming language.

22. The method of claim 1 further comprising:
   ensuring said shared data is not modified by a user wherein said user is not authorized to modify said shared data.

23. The method of claim 1 wherein said distributing of said shared data item between said first location and said second location in real time is bi-directional.

24. An autonomous, secure data synchronizer comprising:
   a storage device configured to store a local state of a shared data item wherein said local state is stored at a first location;
   a detection unit configured to detect a difference between said local state and a second state of said shared data item wherein said second state is located at a second location wherein said first location and said second location are connected by a computer network;
   a synchronizing device configured to synchronize said local state and said second state; and
   a distribution unit configured to distribute said shared data item between said first location and said second location in real-time.

25. The autonomous, secure data synchronizer of claim 24 wherein said detection unit comprises:
   a security unit configured to secure a communication wherein said communication is between said first location and said second location.

26. The autonomous, secure data synchronizer of claim 25 wherein said security unit is further configured to encrypt said communication.

27. The autonomous, secure data synchronizer of claim 25 wherein said security unit is further configured to authenticate said communication.

28. The autonomous, secure data synchronizer of claim 25 wherein said security unit is further configured to use a Secure Sockets Layers protocol.

29. The autonomous, secure data synchronizer of claim 24 wherein said synchronizing device comprises:
   a security unit configured to secure a communication wherein said communication is between said first location and said second location.

30. The autonomous, secure data synchronizer of claim 29 wherein said security unit is further configured to encrypt said communication.

31. The autonomous, secure data synchronizer of claim 29 wherein said security unit is further configured to authenticate said communication.

32. The autonomous, secure data synchronizer of claim 29 wherein said security unit is further configured to use a Secure Sockets Layers protocol.

33. The autonomous, secure data synchronizer of claim 24 wherein said computer network is the Internet.

34. The autonomous, secure data synchronizer of claim 24 further comprising:
   a disconnecting mechanism configured to disconnect said first location from said computer network wherein disconnecting said first location does not alter a consistency requirement of said shared data.

35. The autonomous, secure data synchronizer of claim 34 further comprising:
   a reconnecting mechanism configured to reconnect said first location to said computer network wherein reconnecting said first location does not alter said consistency requirement of said shared data.

36. The autonomous, secure data synchronizer of claim 24 wherein said storage device, said detection unit and said synchronizing device operate without a human request for an action.

37. The autonomous, secure data synchronizer of claim 24 further comprising:
   a determiner configured to determine a set of users wherein said set are authorized to receive said shared data; and
   an encryption unit configured to encrypt said shared data wherein only a member of said set is able to decrypt said shared data.

38. The autonomous, secure data synchronizer of claim 24 further comprising:
   an administrative unit configured to ensure said shared data is not distributed to a user wherein said user is not authorized to access said shared data.

39. The autonomous, secure data synchronizer of claim 24 wherein said shared data is modified at said first location.

40. The autonomous, secure data synchronizer of claim 39 wherein said synchronizing device is further configured to modify said second state to match said local state.

41. The autonomous, secure data synchronizer of claim 24 wherein said shared data is modified at said second location.

42. The autonomous, secure data synchronizer of claim 41 wherein said synchronizing device is further configured to modify said local state to match said second state.

43. The autonomous, secure data synchronizer of claim 24 further comprising:
   a compatibility device configured to enable said first location to receive said data item independent of a platform used at said first location.

44. The autonomous, secure data synchronizer of claim 43 wherein said compatibility device is further configured to use a version of the Java programming language.

45. The autonomous, secure data synchronizer of claim 24 further comprising:
   an administrative unit configured to ensure said shared data is not modified by a user wherein said user is not authorized to modify said shared data.

46. The autonomous secure data synchronizer of claim 24 wherein said distribution unit distributes said shared data item bi-directionally between said first location and said second location.

47. A computer program product comprising:
   a computer usable medium having computer readable program code embodied therein configured for autonomous, secure data synchronization, comprising:
      computer readable code configured to cause a computer to store a local state of a shared data item wherein said local state is stored at a first location;
      computer readable code configured to cause a computer to detect a difference between said local state and a second state of said shared data item wherein said second state is located at a second location wherein said first location and said second location are connected by a computer network;

computer readable code configured to cause a computer to synchronize said local state and said second state; and computer readable code configured to cause a computer to distribute said shared data item between said first location and said second location.

48. The computer program product of claim 47 wherein said computer readable code configured to cause a computer to detect comprises:

computer readable code configured to cause a computer to secure a communication wherein said communication is between said first location and said second location.

49. The computer program product of claim 48 wherein said computer readable code configured to cause a computer to secure is further configured to encrypt said communication.

50. The computer program product of claim 48 wherein said computer readable code configured to cause a computer to secure is further configured to authenticate said communication.

51. The computer program product of claim 48 wherein said computer readable code configured to cause a computer to secure is further configured to use a Secure Sockets Layers protocol.

52. The computer program product of claim 47 wherein said computer readable code configured to cause a computer to synchronize comprises:

computer readable code configured to cause a computer to secure a communication wherein said communication is between said first location and said second location.

53. The computer program product of claim 52 wherein said computer readable code configured to cause a computer to secure is further configured to encrypt said communication.

54. The computer program product of claim 52 wherein said computer readable code configured to cause a computer to secure is further configured to authenticate said communication.

55. The computer program product of claim 52 wherein said computer readable code configured to cause a computer to secure is further configured to use a Secure Sockets Layers protocol.

56. The computer program product of claim 47 wherein said computer network is the Internet.

57. The computer program product of claim 47 further comprising:

computer readable code configured to cause a computer to disconnect said first location from said computer network wherein disconnecting said first location does not alter a consistency requirement of said shared data.

58. The computer program product of claim 57 further comprising:

computer readable code configured to cause a computer to reconnect said first location to said computer network wherein reconnecting said first location does not alter said consistency requirement of said shared data.

59. The computer program product of claim 57 wherein said computer readable code configured to cause a computer to store, said computer readable code configured to cause a computer to detect and said computer readable code configured to cause a computer to synchronize operate without a human request for an action.

60. The computer program product of claim 47 further comprising:

computer readable code configured to cause a computer to determine a set of users wherein said set are authorized to receive said shared data; and computer readable code configured to cause a computer to encrypt said shared data wherein only a member of said set is able to decrypt said shared data.

61. The computer program product of claim 47 further comprising:

computer readable code configured to cause a computer to ensure said shared data is not distributed to a user wherein said user is not authorized to access said shared data.

62. The computer program product of claim 47 wherein said shared data is modified at said first location.

63. The computer program product of claim 62 wherein said computer readable code configured to cause a computer to synchronize is further configured to modify said second state to match said local state.

64. The computer program product of claim 47 wherein said shared data is modified at said second location.

65. The computer program product of claim 64 wherein said computer readable code configured to cause a computer to synchronize is further configured to modify said local state to match said second state.

66. The computer program product of claim 47 further comprising:

computer readable code configured to cause a computer to enable said first location to receive said data item independent of a platform used at said first location.

67. The computer program product of claim 66 wherein said computer readable code configured to cause a computer to enable is further configured to use a version of the Java programming language.

68. The computer program product of claim 47 further comprising:

computer readable code configured to cause a computer to ensure said shared data is not modified by a user wherein said user is not authorized to modify said shared data.

69. The computer program product of claim 47 wherein said computer readable code configured to cause a computer to distribute is further configured to bi-directionally send said shared data item between said first location and said second location.

* * * * *

UNITED STATES PATENT AND TRADEMARK OFFICE
CERTIFICATE OF CORRECTION

PATENT NO. : 6,754,678 B2
APPLICATION NO. : 09/746550
DATED : June 22, 2004
INVENTOR(S) : Jeffrey S. Norris et al.

It is certified that error appears in the above-identified patent and that said Letters Patent is hereby corrected as shown below:

Column 1, after the heading, BACKGROUND OF THE INVENTION, line 12 please insert the following paragraph:

--The invention described herein was made in the performance of work under a NASA contract and is subject to the provisions of Public Law 96-517 (35 U.S.C. 202) in which the Contrator has elected to retain title.--

Signed and Sealed this

Twenty-eighth Day of November, 2006

JON W. DUDAS
*Director of the United States Patent and Trademark Office*